US008438257B2

(12) United States Patent
Belinchón Vergara et al.

(10) Patent No.: US 8,438,257 B2
(45) Date of Patent: May 7, 2013

(54) METHODS, APPARATUSES AND COMPUTER PROGRAM FOR IMS RECOVERY UPON RESTART OF A S-CSCF

(75) Inventors: Maria-Carmen Belinchón Vergara, Getafe/Madrid (ES); Germán Blanco, Paracuellos del Jarama (ES); Hubert Przybysz, Hägersten (SE); Stephen Terrill, Villanueva de la Canada (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 260 days.

(21) Appl. No.: 12/668,291

(22) PCT Filed: Jul. 10, 2007

(86) PCT No.: PCT/EP2007/057060
§ 371 (c)(1),
(2), (4) Date: Jul. 28, 2010

(87) PCT Pub. No.: WO2009/006942
PCT Pub. Date: Jan. 15, 2009

(65) Prior Publication Data
US 2010/0293261 A1 Nov. 18, 2010

(51) Int. Cl.
*G06F 15/173* (2006.01)
(52) U.S. Cl.
USPC .......................................... 709/223; 709/221
(58) Field of Classification Search .................. 709/223, 709/224–229, 217–221; 455/424, 414.2, 455/455/415, 419, 343.6, 450, 435.1, 436, 455/442, 551, 432.1, 433
See application file for complete search history.

(56) References Cited

U.S. PATENT DOCUMENTS

| 7,684,786 B2* | 3/2010 | Hurtta et al. ................... 455/411 |
| 7,697,471 B2* | 4/2010 | Purnadi et al. ................. 370/328 |
| 2002/0128008 A1* | 9/2002 | Phan-Anh et al. ............. 455/424 |
| 2002/0147824 A1* | 10/2002 | Hurtta et al. ................... 709/230 |
| 2007/0274289 A1* | 11/2007 | Buckley et al. ............... 370/351 |
| 2008/0182575 A1* | 7/2008 | Torres et al. ............... 455/435.1 |

FOREIGN PATENT DOCUMENTS

| EP | 1 916 821 | 4/2008 |
| WO | WO 2007/012270 | 2/2007 |

OTHER PUBLICATIONS

International Search Report for PCT/EP2007/057060, mailed Jul. 25, 2008.
International Preliminary Report on Patentability with 12 Amended Sheets, dated Nov. 5, 2009.

(Continued)

*Primary Examiner* — Ruolei Zong
(74) *Attorney, Agent, or Firm* — Nixon & Vanderhye, P.C.

(57) ABSTRACT

Methods and apparatus facilitate recovery of an IMS in which an S-CSCF has suffered a restart (after a failure, software upgrade, or other reasons). One or more of first and second methods comprise submitting, from the S-CSCF towards a HSS, contact data required by the S-CSCF to contact a given subscriber, or to contact a proxy server through which the subscriber is accessible; storing the contact data at the HSS; and providing from the HSS towards an IMS entity, which may be previously assigned S-CSCF or a new S-CSCF, contact information elements selectable from the contact data.

19 Claims, 9 Drawing Sheets

OTHER PUBLICATIONS

3GPP CN/CT: Digital cellular telecommunications system (Phase 2+); Universal Mobile Telecommunications System (UMTS); IP Multimedia (IM) Subsystem Cx and Dx Interfaces; Signalling flows and message contents (3GPP TS 29.228 version 7.3.0 Release 7); ETSI TS 129 228, vol. 3-CN4, No. V7.3.0, (Sep. 1, 2006), pp. 1-59.
"Reassignment for S-CSCF during the terminated call procedure", TSG-SA Working Group 2, No. 50, (Jan. 16, 2006), pp. 1-2.

3GPP TS 23.228, "3$^{rd}$ Generation Partnership Project; Technical Specification Group Services and Systems Aspects; IP Multimedia Subsystem (IMS); Stage 2 (Release 7)," V7.8.0, Jun. 2007.
3GPP TS 23.228, "3$^{rd}$ Generation Partnership Project; Technical Specification Group Services and Systems Aspects; IP Multimedia Subsystem (IMS); Stage 2 (Release 8)," V8.1.0, Jun. 2007.

* cited by examiner

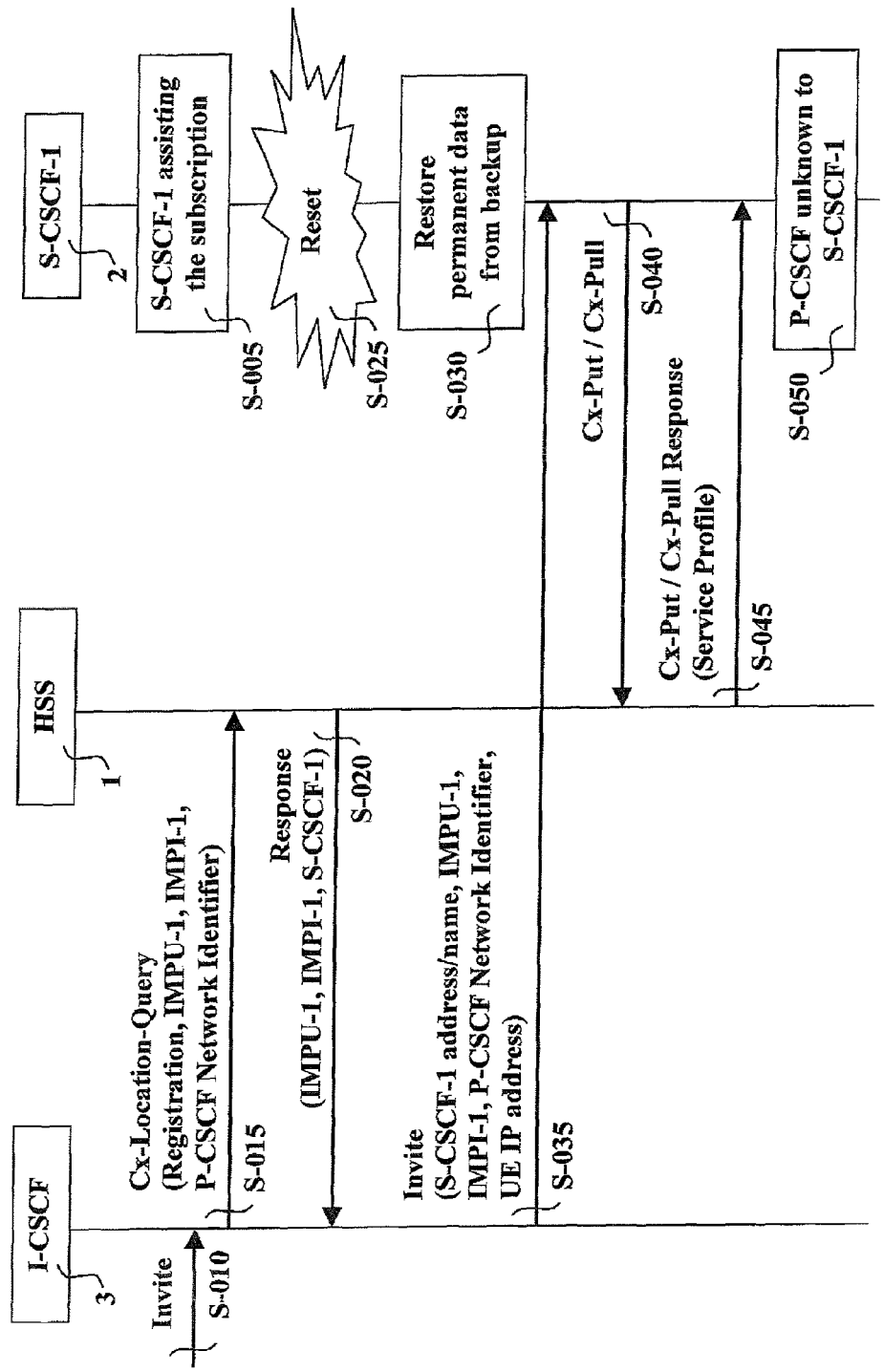
FIG.-1-

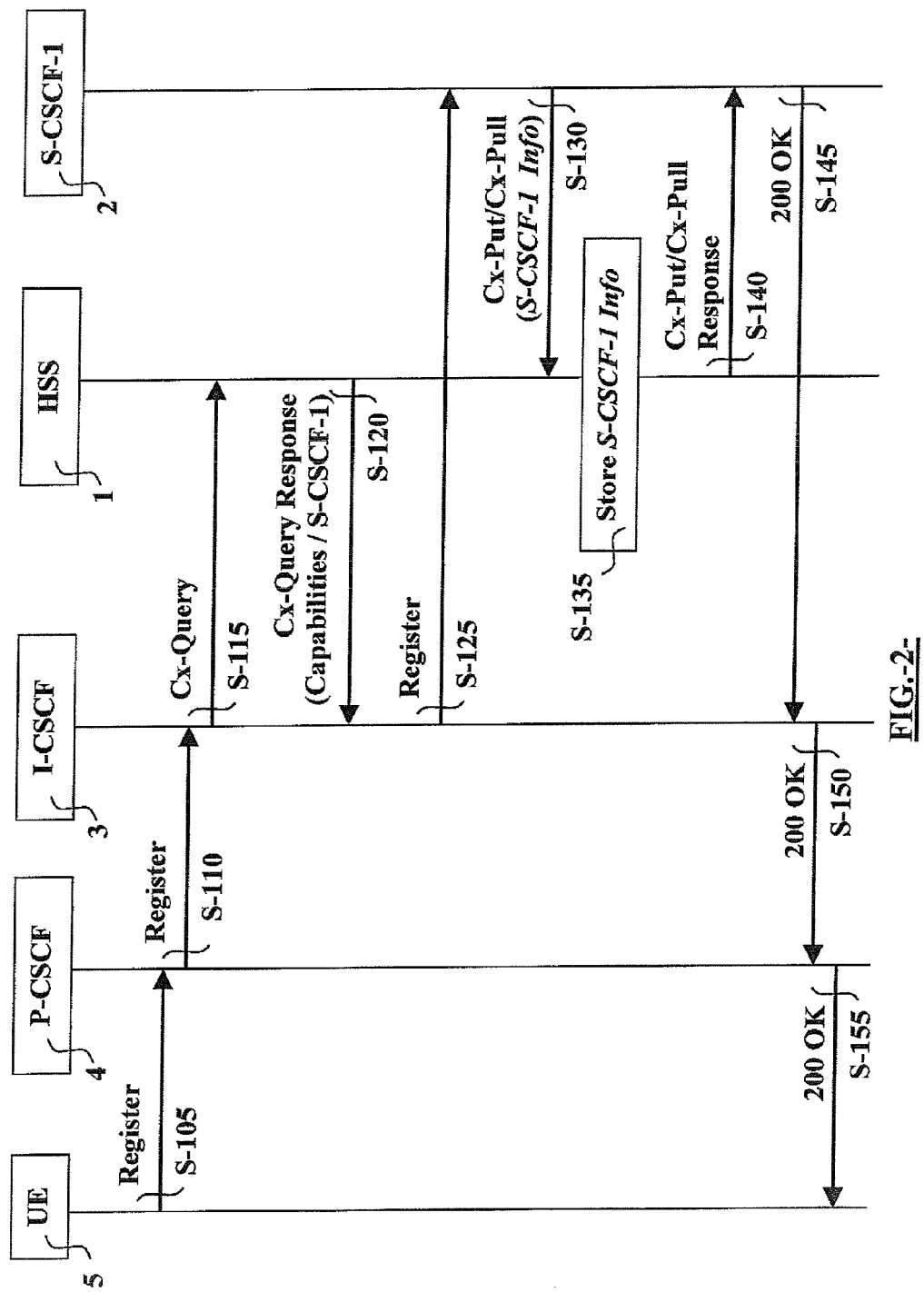
FIG.-2-

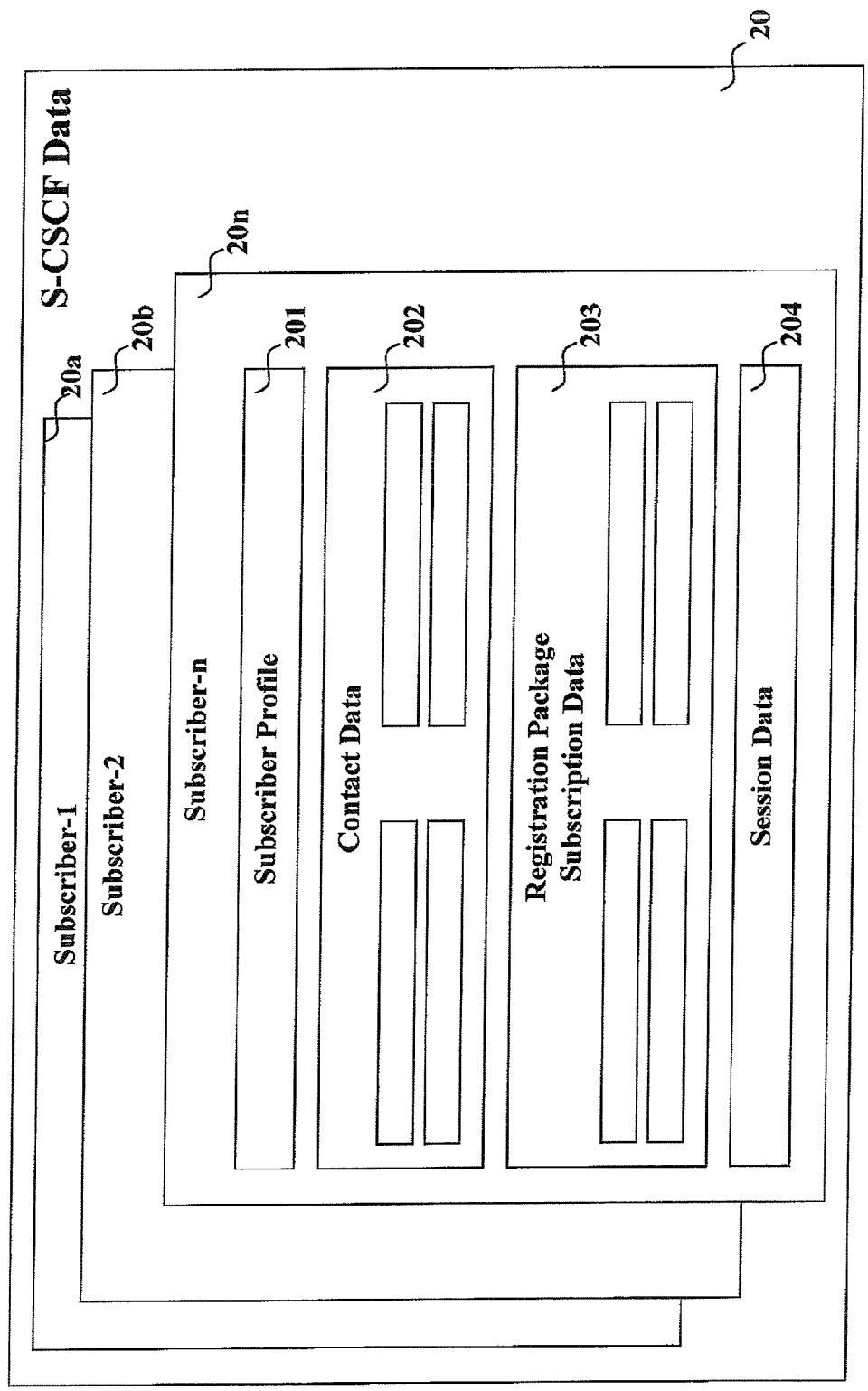
FIG.-3-

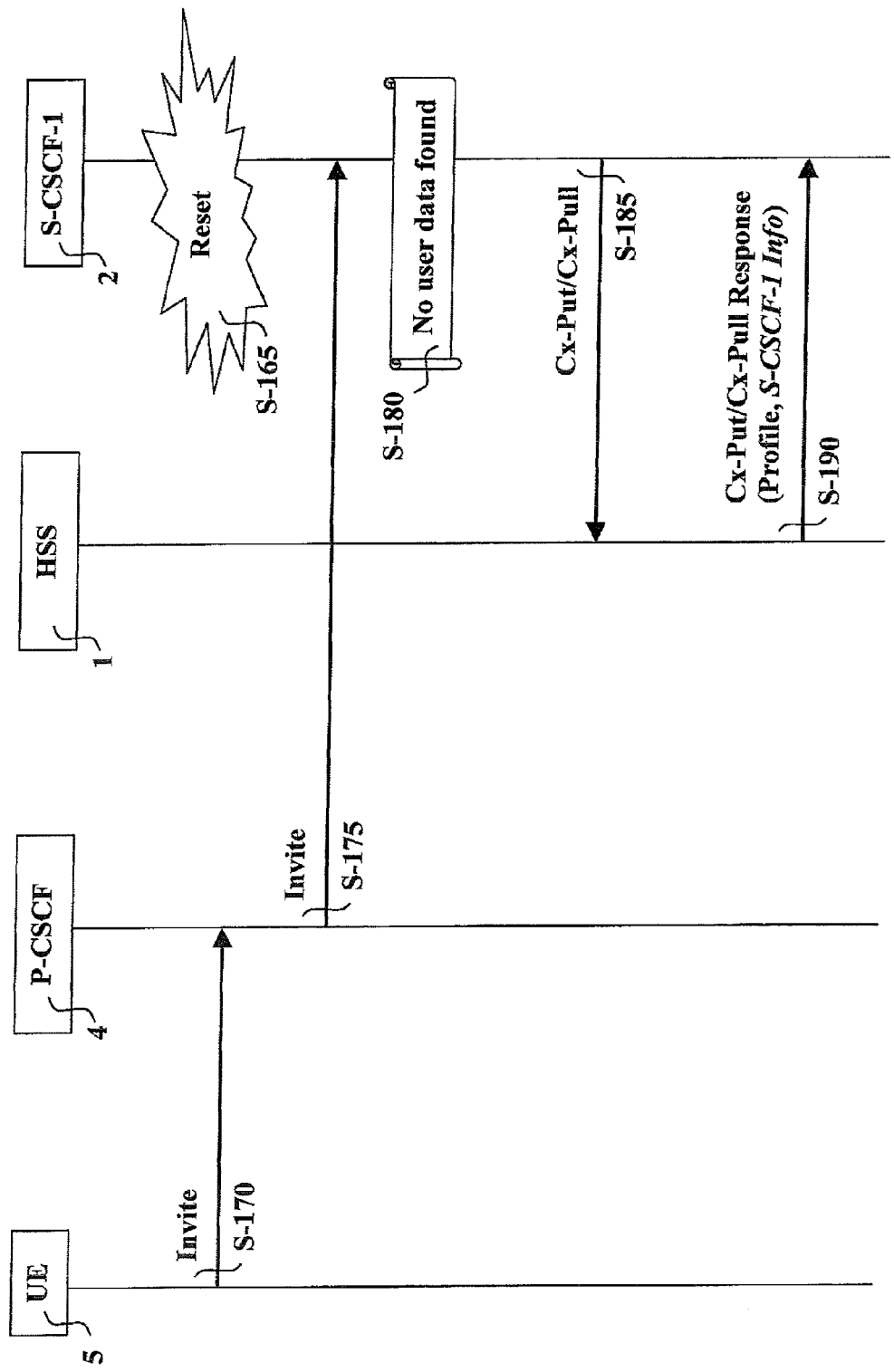
FIG.-4-

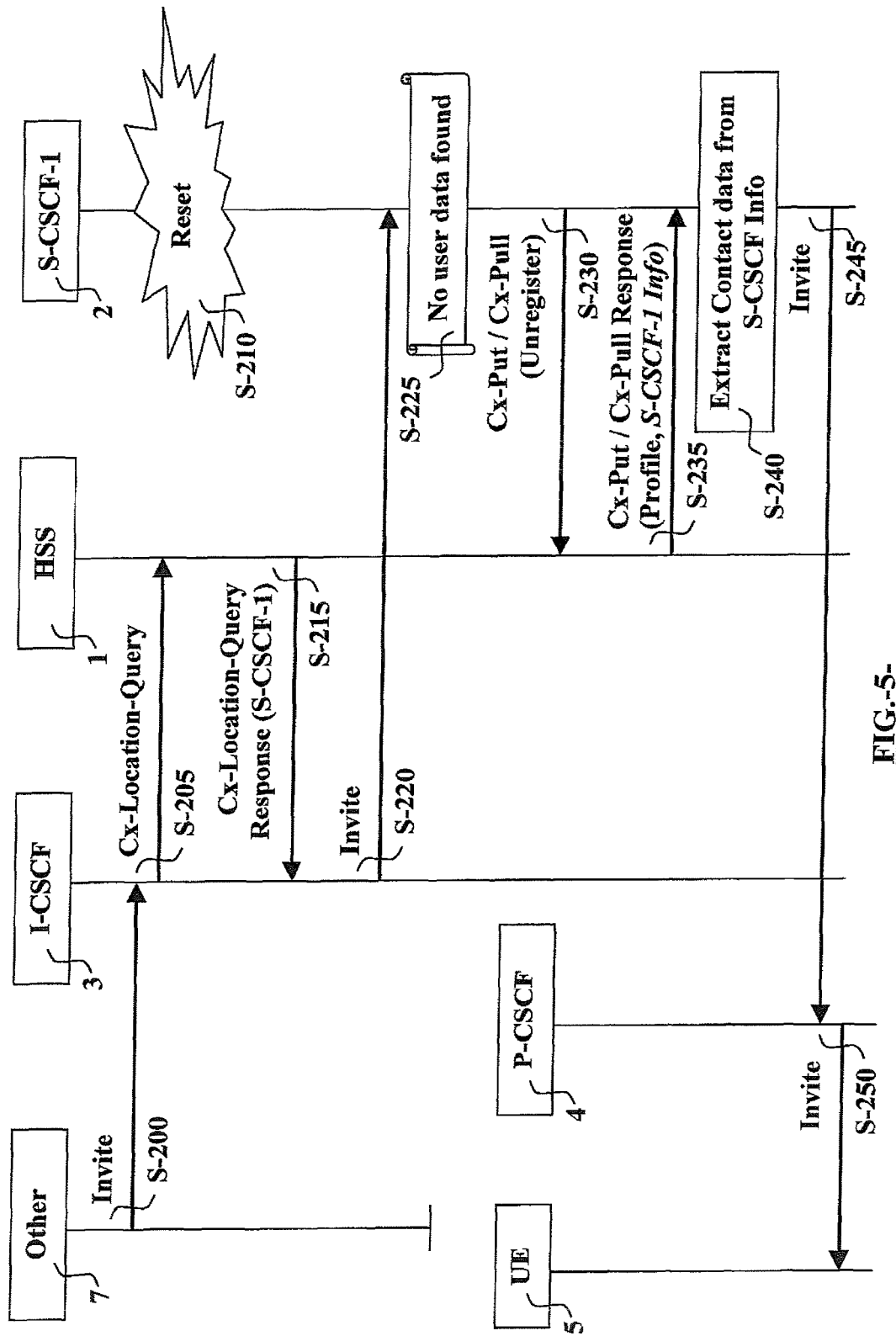
FIG.-5-

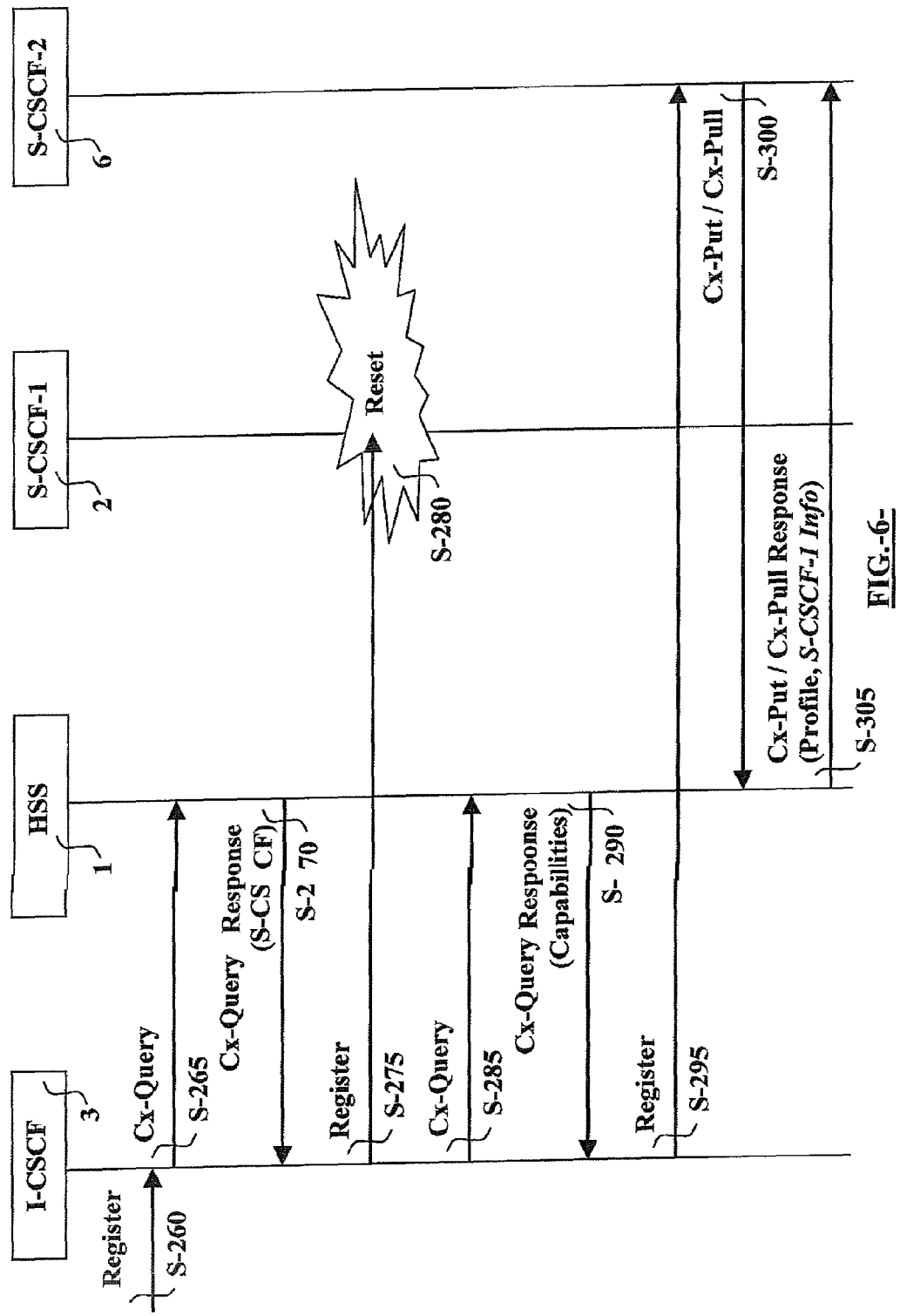
FIG.-6-

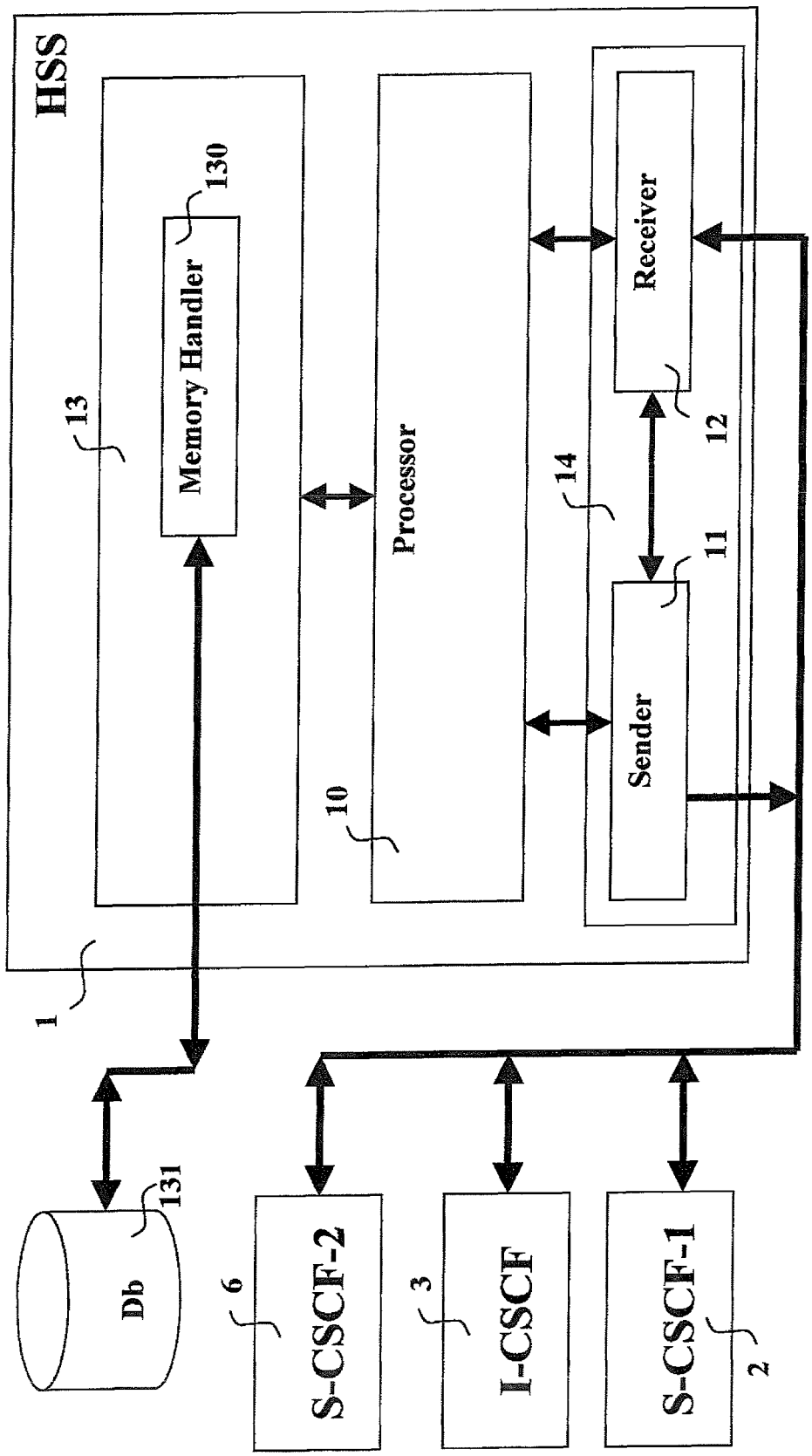
FIG.-7-

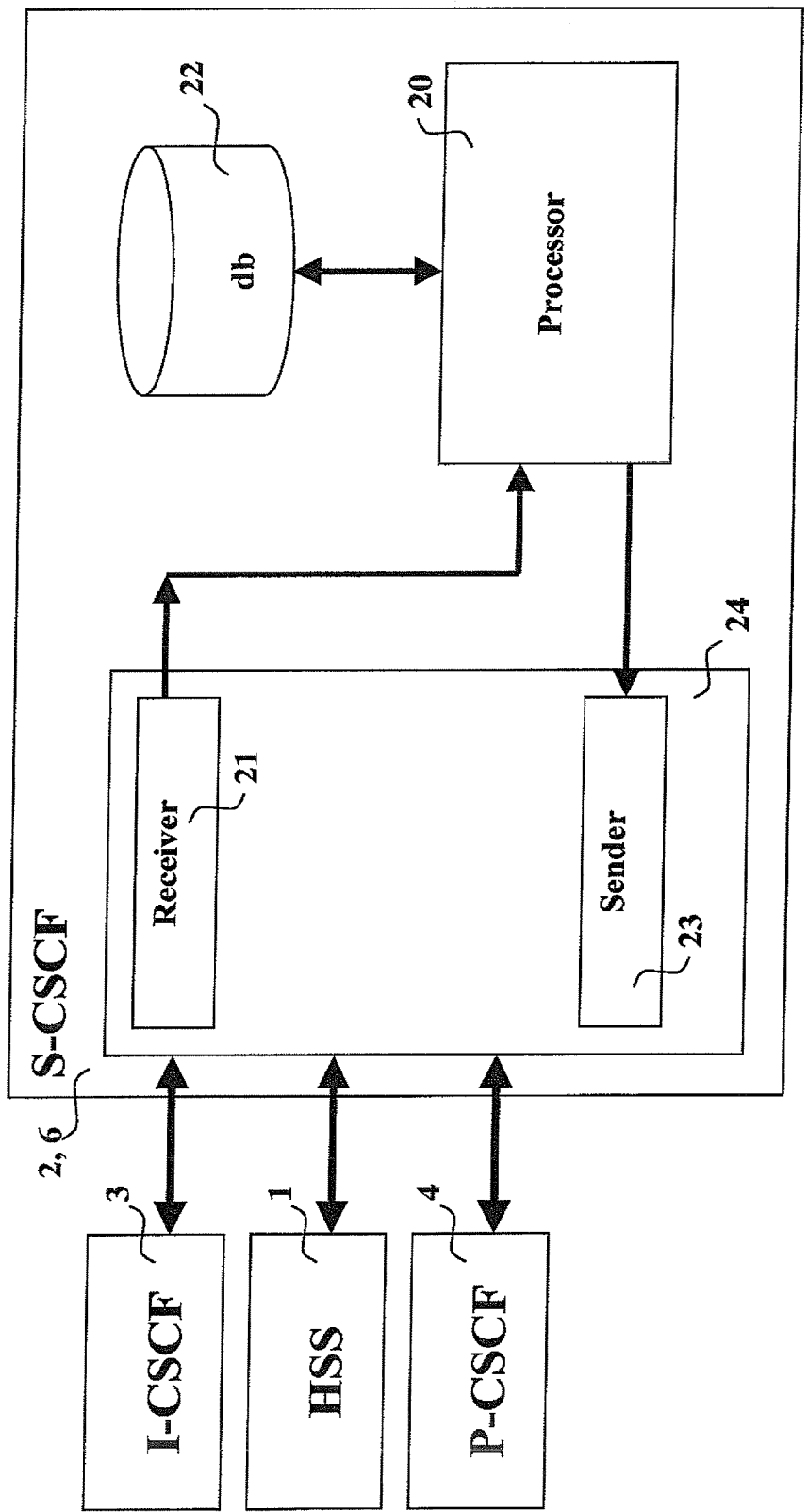
FIG.-8-

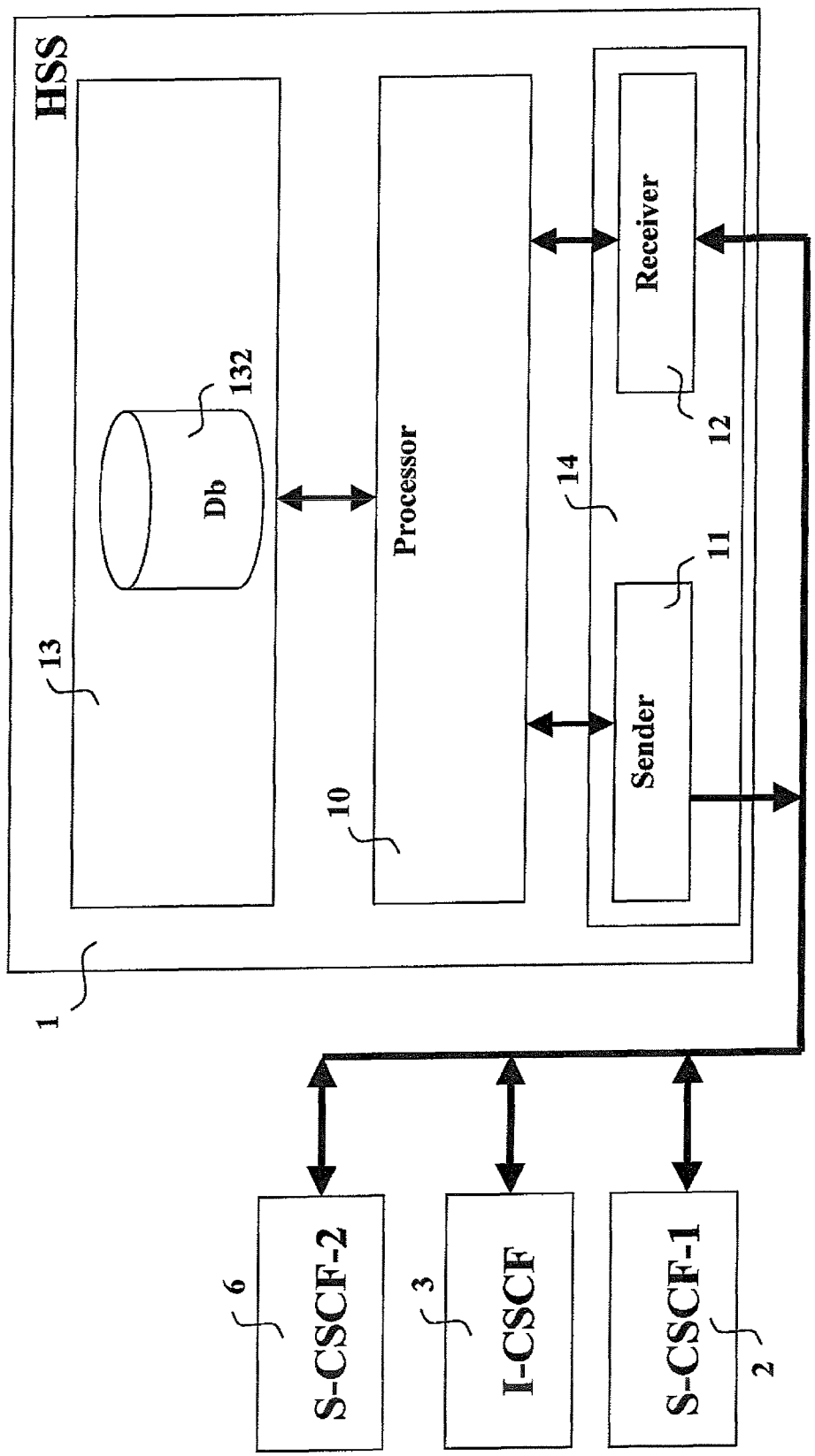
FIG.-9-

METHODS, APPARATUSES AND COMPUTER PROGRAM FOR IMS RECOVERY UPON RESTART OF A S-CSCF

This application is the U.S. national phase of International Application No. PCT/EP2007/057060 filed 10 Jul. 2007, which designated the U.S., the entire contents of which is hereby incorporated by reference.

TECHNICAL FIELD

The technology disclosed herein generally relates to recovery procedures to apply in an IP Multimedia Subsystem where a critical IMS entity has suffered a restart after a failure, a reset, or a software or hardware update. In particular, the technology disclosed herein addresses those recovery procedures to apply where a Serving Call Session Control Function server is the critical entity which has suffered the restart.

BACKGROUND

Certain entities of a telecommunication network are found to be critical entities expected to be fault tolerant since a failure in such entities may cause an important network failure and a huge amount of subscribers of such network not being able to communicate. In particular, where the telecommunication network is an IP Multimedia Subsystem (hereinafter IMS), a Serving Call Session Control Function server (hereinafter S-CSCF) serving a number of IMS subscribers is found to be one of said entities whose failure might make the IMS reach abnormal processing conditions so that the number of IMS subscribers served in said S-CSCF cannot properly make use of services or cannot even make calls. In this respect, most or all failures are accompanied by a reset of the failing entity and a sort of restart once the failure has been solved, likely by reloading permanent stable data if inconsistent data were found to be a reason for the failure. Moreover, not only the prevention of a failure in any critical entity is an issue but also other situations causing the critical entity to become out of service, such as a software or hardware update which cannot enter into operation without producing a restart of the critical entity concerned.

Regarding the abnormal processing conditions that an IMS network may reach after a S-CSCF restart, an interested reader has to take into account the different sequence of actions that may take place for a given subscriber simultaneously or immediately after the SCSCF restart, how such actions are said to be treated in accordance with the 3GPP Technical Specification 23.228 v.7.8.0 and v.8.1.0, and how such actions concern the S-CSCF. In particular, a given subscriber may register in the IMS in accordance with this 3GPP Technical Specification, and being assigned a particular S-CSCF selected for serving the given subscriber. This S-CSCF is assigned in a Home Subscriber Server (hereinafter HSS), which holds subscriber data for the IMS subscribers, for serving the given subscriber and the S-CSCF receives from the HSS a subscriber profile with subscriber data required for serving the given subscriber. An abnormal situation may occur where a first S-CSCF, namely the S-CSCF-1 depicted in FIG. 1, is presently serving the given subscriber and is thus assigned in the HSS, and where said S-CSCF-1 suffers a reset to restart again after having solved a fault situation. In this situation, the S-CSCF-1 is still assigned at the HSS for serving the given subscriber but the S-CSCF might have lost or not trust the subscriber data for the given subscriber.

FIG. 1 illustrates an exemplary abnormal situation that may further occur where an invitation to communicate addressing the given subscriber is received at an Interrogating Call Session Control Function server (hereinafter I-CSCF) from another IMS network. Then, the I-CSCF interrogates the HSS asking for a S-CSCF currently serving the given subscriber. As already commented above, the S-CSCF-1 is assigned in the HSS for serving the given subscriber, so that the HSS responds with an identifier of said S-CSCF-1. Before the I-CSCF is able to forward the invitation to communicate with the given subscriber served by the S-CSCF-1, said S-CSCF-1 suffers a restart and, as a consequence of which, the previously operative subscriber data at the S-CSCF-1 are lost or found to be not trustable. When the invitation forwarded from the I-CSCF to communicate with the given subscriber is received at the S-CSCF-1, the given subscriber is assumed unknown to the S-CSCF-1, and a confirmation of being serving the current subscriber is submitted towards the HSS to implicitly request subscriber data for the given subscriber. The HSS then returns a subscriber profile with necessary data for serving the given subscriber. However, since other data obtained during the original registration of the given subscriber were lost, the S-CSCF-1 ignores data concerning the signalling path between the given subscriber and the S-CSCF-1 such as, for example, a Proxy Call Session Control Function server (hereinafter P-CSCF) through which the given subscriber had accessed the IMS. In this situation, the S-CSCF-1 can only take actions such as connecting a mailbox to the originating subscriber or the like, but cannot connect the originating subscriber with the terminating given subscriber.

Another abnormal situation, not illustrated in any drawing, might occur where a previously assigned S-CSCF-1 suffers a restart during a handover procedure to assign a new S-CSCF for serving the given subscriber. The new assigned S-CSCF may obtain the subscriber profile but it ignores data concerning the signalling path towards the given subscriber. Also in this situation, the S-CSCF-1 cannot connect the originating subscriber with the terminating given subscriber.

Nowadays, such failures in telecommunication networks can be prevented, or are at least minimized by having mated entities which may enter into operation to replace a failing entity or an entity to be upgraded, such as a redundant HSS provides for, whereby once the restart has taken place, the redundant HSS updates the restarted HSS with all updated data and then the operation mode is switched back to make the restarted HSS operative whilst the redundant HSS is switched to a non-operating mode. However, the redundancy is an optional configuration suitable for subscriber databases holding subscription data for a huge number of quasi-permanent subscribers and not affordable for call control servers such as the S-CSCF where the served subscribers are changing very often. Therefore, there is a need to provide a mechanism for recovery of the IMS where a S-CSCF has suffered a restart after a failure, a software upgrade or other reasons.

SUMMARY

The technology disclosed herein is aimed to obviate at least some of the above disadvantages and provides means and methods for recovery of the IMS where a S-CSCF serving a number of subscribers of the IMS has suffered a restart.

In accordance with a first aspect of the technology disclosed herein there is provided a first method for recovery of the IMS, to be applied in a HSS holding subscriber data for subscribers of the IMS, upon restart of a S-CSCF assigned for serving a given subscriber.

In accordance with a second aspect of the technology disclosed herein there is provided a second method for recovery of the IMS upon restart of a S-CSCF serving a given subscriber, and to be applied in a S-CSCF selected for serving a given subscriber.

Both first and second methods cooperate so that the course of actions carried out in the HSS are accompanied by a corresponding course of actions in the S-CSCF to achieve the complete recovery of the IMS for those subscribers previously served in the S-CSCF suffering the restart.

Thus, the first method to be applied in the HSS upon a S-CSCF restart, comprises the steps of: receiving at the HSS from the selected S-CSCF contact data required by the S-CSCF to contact the given subscriber or a proxy server through which the subscriber is accessible; storing the contact data for the assigned S-CSCF; and, after having completed the restart at the S-CSCF, providing from the HSS towards an IMS entity contact information elements selectable from the contact data.

In particular, and where the first method is preferably applied during the selection of a suitable S-CSCF for serving the given subscriber, the first method may further comprise the steps of: receiving at the HSS a confirmation from a S-CSCF selected for serving the given subscriber; and assigning at the HSS the selected S-CSCF for serving the given subscriber. Moreover, the method may further comprise to this end a step of downloading a subscriber profile for the given subscriber from the HSS towards the S-CSCF. In addition, the step of receiving at the HSS contact data from the S-CSCF may include the step of receiving the confirmation from the S-CSCF of being selected for serving the given subscriber To this end, and in accordance with a third aspect of the technology disclosed herein, there is provided a HSS holding subscriber data for subscribers of the IMS and having: a memory module for accessing subscriber data stored for each subscriber of the IMS; a receiver arranged for receiving from a S-CSCF, selected for serving a given subscriber, contact data required by the S-CSCF to contact the given subscriber or a proxy server through which the subscriber is accessible; a processor arranged for accessing the memory module to store the received contact data for the assigned S-CSCF; and a sender arranged for providing towards relevant IMS entities contact information elements selectable from the contact data. In some implementations, the memory module of the HSS may include a memory handler for accessing subscriber data stored in an external database for each subscriber of the IMS. Alternatively, the memory module may include an internal database for storing subscriber data for each subscriber of the IMS. Where signalling load is an issue, the sender of the HSS may be arranged for downloading a subscriber profile for the given subscriber along with the contact information elements towards the S-CSCF.

In particular, and where the first method is preferably applied during the selection of a suitable S-CSCF, the receiver of the HSS may be arranged for receiving a confirmation from the S-CSCF selected for serving a given subscriber; and the processor of the HSS may be arranged for assigning the S-CSCF in the memory module for serving the given subscriber. Moreover, the sender of the HSS may be arranged for downloading a subscriber profile for the given subscriber towards the S-CSCF.

The second method to be applied in a S-CSCF selected for serving a given subscriber comprises a step of submitting from a first S-CSCF previously selected for serving a given subscriber, towards a Home Subscriber Server "HSS" holding subscriber data for subscribers of the IMS, contact data required by the first S-CSCF to contact the given subscriber or a proxy server through which the subscriber is accessible; and a step of receiving from the HSS at a second S-CSCF, currently selected for serving the given subscriber, contact information elements selectable from the contact data of the previously selected S-CSCF. Advantageously, this second method may further comprise a step of storing the contact data at the S-CSCF to further contact the given subscriber or the proxy server through which subscriber is accessible.

In particular, and where the second method is preferably applied during the selection of a suitable S-CSCF for serving a given subscriber upon registration or invitation related to the given subscriber, the second method may further comprise a step of receiving at the S-CSCF a registration or an invitation related to a given subscriber from an IMS entity, such as an I-CSCF or a P-CSCF; and a step of submitting a confirmation of being selected for serving the given subscriber, from the S-CSCF towards the HSS. Moreover, the method may further comprise to this end a step of receiving at the S-CSCF a subscriber profile for the given subscriber from the HSS. A lower signalling load may be achieved where the step of submitting the contact data towards the HSS includes the step of submitting the confirmation of being selected for serving the given subscriber from the S-CSCF, and the step of receiving the subscriber profile for the given subscriber from the HSS.

To this end, and in accordance with a fourth aspect of the technology disclosed herein, there is provided a S-CSCF assignable for serving a subscriber registered in the IMS and having: a memory module for storing subscriber data, received from a HSS holding subscriber data for subscribers of the IMS, for subscribers currently served in the S-CSCF; a sender arranged for submitting towards the HSS contact data required by the S-CSCF to contact the given subscriber or a proxy server through which the subscriber is accessible; a receiver arranged for receiving from the HSS contact information elements selectable from the contact data of a previously assigned S-CSCF; and a processor arranged for accessing the memory module to store the contact information elements received from the HSS for the given subscriber. Advantageously, in order to reduce the signalling load, the receiver of the S-CSCF may be arranged for receiving the subscriber profile for the given subscriber along with the contact information elements from the HSS.

In particular, and where the second method is preferably applied during the selection of a suitable S-CSCF for serving a given subscriber upon registration or invitation related to the given subscriber, the receiver of the S-CSCF may be arranged for receiving a registration of a given subscriber from an IMS entity, and the sender of the S-CSCF may be arranged for submitting towards the HSS a confirmation of being selected for serving the given subscriber. Moreover, the receiver of the S-CSCF may be arranged for receiving the subscriber profile for the given subscriber along with the contact information elements from the HSS.

In a first embodiment of these first and second methods, the contact data may include, as contact information elements, a contact address to reach a P-CSCF through which the given subscriber has accessed the IMS and, optionally, a contact address to reach the user equipment. To this end, the processor of the HSS may be arranged for extracting as contact information elements from the contact data a contact address to reach a P-CSCF where the given subscriber has accessed the IMS through and, optionally, a contact address to reach the user equipment. Also to this end, the receiver of the S-CSCF may be arranged for receiving, as contact information elements, a contact address to reach a P-CSCF through which the user has accessed the IMS and, optionally, a contact address to reach the user equipment.

In a second embodiment of these first and second methods, the contact data may include a number of contact information elements selected from: user's Display-Name, uniform locator identifier as defined by a Session Initiation Protocol "SIP-URI", list of contact addresses including an IP address of the user equipment in use by the given subscriber, contact header parameters, list of proxy servers through which the subscriber is accessible, and combinations thereof. In particular, the list of proxy servers through which the subscriber is accessible may include in this second embodiment a P-CSCF through which the given subscriber has accessed the IMS. Also in particular, the SIP URI may include in this second embodiment, as a contact information element, a Globally Routable User agent URI "GRUU" usable to take routing decisions. To this end, the processor of the HSS may be arranged for extracting as contact information elements from the contact data: user's Display-Name, uniform locator identifier as defined by a Session Initiation Protocol "SIP-URI", list of contact addresses including an IP address of the user equipment in use by the given subscriber, contact header parameters, list of proxy servers through which the subscriber is accessible, and combinations thereof. In particular, the processor of the HSS may be arranged for obtaining from the list of proxy servers, through which the subscriber is accessible, a P-CSCF through which the given subscriber has accessed the IMS. Also in particular, the processor of the HSS may be arranged for obtaining from the SIP URI a Globally Routable User agent URI "GRUU" usable to take routing decisions. Also to this end, the receiver of the S-CSCF may be arranged for receiving as contact information elements from the contact data: user's Display-Name, uniform locator identifier as defined by a Session Initiation Protocol "SIP-URI", list of contact addresses including an IP address of the user equipment in use by the given subscriber, contact header parameters, list of proxy servers through which the subscriber is accessible, and combinations thereof. In particular, the receiver of the S-CSCF may be arranged for obtaining from the list of proxy servers, through which the subscriber is accessible, a P-CSCF through which the given subscriber has accessed the IMS. Also in particular, the receiver of the S-CSCF may be arranged for obtaining from the SIP URI a Globally Routable User agent URI "GRUU" usable to take routing decisions.

Both cooperating first and second methods do not require a explicit step of detecting a restart condition at a previously assigned S-CSCF, however, such step may be carried out at the S-CSCF suffering the restart, or at an I-CSCF selecting a S-CSCF for serving the given subscriber, or at a new S-CSCF selected for serving the given subscriber, or even at a HSS receiving a confirmation from a S-CSCF of being selected for serving a given subscriber whilst having already assigned a S-CSCF for serving such given subscriber. Where the step of detecting a restart condition at a previously assigned S-CSCF is carried out at a S-CSCF, the processor of said S-CSCF may be arranged for detecting the restart condition.

In an embodiment of the first method, the step of providing contact information elements is carried out from the HSS towards the S-CSCF serving the given subscriber, and is responsive to a step of querying about the given subscriber. This embodiment is suitable where an originating invitation from a given subscriber is received at the previously assigned S-CSCF after having suffered the restart. To this end, the receiver of the HSS may be arranged for receiving a query about a given subscriber from the S-CSCF serving said given subscriber, and the sender of the HSS may be arranged for providing the contact information elements towards said S-CSCF.

In another embodiment of the first method, the step of providing contact information elements is carried out from the HSS towards the S-CSCF serving the given subscriber, and is responsive to a step of requesting the HSS from the S-CSCF to consider the given subscriber as unregistered. In particular, the step of providing contact information elements from the HSS towards the S-CSCF serving the given subscriber may include a step of requesting to the S-CSCF to consider the given subscriber as registered. This embodiment is suitable where a terminating invitation addressing the given subscriber is received at the previously assigned S-CSCF after having suffered the restart, and the later assumes such a subscriber being unregistered. To this end, the receiver of the HSS may be arranged for receiving a request, from the S-CSCF serving the given subscriber, to consider the given subscriber as unregistered, and the sender of the HSS may be arranged for providing the contact information elements towards said S-CSCF. In particular, the sender of the HSS may be arranged under this embodiment for instructing said S-CSCF to consider the given subscriber as registered.

In still another embodiment of the first method, the step of providing contact information elements is carried out from the HSS towards a new S-CSCF selected for serving the given subscriber, and is responsive to a step of receiving at the HSS a confirmation from the new S-CSCF selected for serving the given subscriber. This embodiment is suitable where a re-registration is received at the previously assigned S-CSCF whilst suffering the restart and not being able to process it so that, after some re-attempts, a new S-CSCF is selected for serving the given subscriber. To this end, the receiver of the HSS may be arranged for receiving a confirmation from a new S-CSCF selected for serving the given subscriber, and the sender of the HSS may be arranged for providing the contact information elements towards said new S-CSCF.

In an embodiment of the second method aligned with the above first method, the step of receiving contact information elements from the HSS takes place at the S-CSCF serving the given subscriber, and is responsive to a step of querying about the given subscriber. As for the above first method, this embodiment is suitable where an originating invitation from a given subscriber is received at the previously assigned S-CSCF after having suffered the restart. To this end, the sender of the S-CSCF may be arranged for sending a query towards the HSS about the given subscriber, and the receiver may be arranged for receiving the contact information elements as response from the HSS.

In another embodiment of the second method aligned with the above first method, the step of receiving contact information elements from the HSS takes place at the S-CSCF serving the given subscriber, and is responsive to a step of requesting the HSS from the S-CSCF to consider the given subscriber as unregistered. In particular, the step of receiving contact information elements from the HSS at the S-CSCF serving the given subscriber may include a step of receiving a request at the S-CSCF from the HSS to consider the given subscriber as registered. As for the above first method, this embodiment is suitable where a terminating invitation addressing the given subscriber is received at the previously assigned S-CSCF after having suffered the restart, and the later assumes such a subscriber being unregistered. To this end, the sender of the S-CSCF may be arranged for sending a request towards the HSS to consider the given subscriber as unregistered, and the receiver of the S-CSCF may be arranged for receiving the contact information elements as response from the HSS. In particular, the receiver of the S-CSCF may also be arranged for receiving a request to consider the given subscriber as registered.

In still another embodiment of the second method aligned with the above first method, the step of receiving contact information elements from the HSS takes place at a new S-CSCF selected for serving the given subscriber, and is responsive to a step of submitting towards the HSS a confirmation of being selected for serving the given subscriber. As for the above first method, this embodiment is suitable where a re-registration is received at the previously assigned S-CSCF whilst suffering the restart and not being able to process it so that, after some re-attempts, a new S-CSCF is selected for serving the given subscriber. To this end, the sender of the new S-CSCF may be arranged for sending a confirmation towards the HSS of being selected for serving the given subscriber during registration of the given subscriber, and the receiver of the new S-CSCF may be arranged for receiving the contact information elements as response from the HSS.

The technology disclosed herein may be practiced by a computer program, which is loadable into an internal memory of a computer with input and output units as well as with a processing unit, the computer program comprises executable software, which may be separable in different portions, adapted to carry out the above method steps in the above different entities, server or devices, when running in a number of computers. In particular, the executable software, or portions thereof, may be recorded in a carrier readable medium.

BRIEF DESCRIPTION OF THE DRAWINGS

The features, objects and advantages of the technology disclosed herein will become apparent by reading this description in conjunction with the accompanying drawings, in which:

FIG. 1 illustrates a sequence diagram of an exemplary abnormal procedure occurring after suffering a restart in a S-CSCF serving a given subscriber of the IMS.

FIG. 2 is a sequence diagram illustrating a new registration procedure for a given subscriber to further allow recovery of the IMS after having a restart in an S-CSCF assigned for serving the given subscriber.

FIG. 3 illustrates a basic data structure held per subscriber basis at a S-CSCF serving subscribers of the IMS to further allow recovery of the IMS after having a restart in the S-CSCF.

FIG. 4 is a sequence diagram illustrating the recovery of the IMS after having detected a restart in a S-CSCF serving subscribers of the IMS, in accordance with a first embodiment of first and second methods for recovery to be respectively applied in the HSS and S-CSCF.

FIG. 5 is a sequence diagram illustrating the recovery of the IMS after having detected a restart in a S-CSCF serving subscribers of the IMS, in accordance with a second embodiment of first and second methods for recovery to be respectively applied in the HSS and S-CSCF.

FIG. 6 is a sequence diagram illustrating the recovery of the IMS after having detected a restart in a S-CSCF serving subscribers of the IMS, in accordance with a third embodiment of first and second methods for recovery to be respectively applied in the HSS and S-CSCF.

FIG. 7 is a basic block diagram illustrating the structural elements that a HSS may comprise in accordance with an embodiment of the technology disclosed herein.

FIG. 8 is a basic block diagram illustrating the structural elements that a S-CSCF may comprise in accordance with an embodiment of the technology disclosed herein.

FIG. 9 is a basic block diagram illustrating the structural elements that a HSS may comprise in accordance with another embodiment of the technology disclosed herein.

DETAILED DESCRIPTION

The following describes some preferred embodiments of a first and a second method for recovery of the IMS, respectively applied in a HSS 1 and a S-CSCF 2, after having a restart in the S-CSCF 2. As already commented above, both first and second methods cooperate with each other so that the course of actions carried out in the HSS are accompanied by a corresponding course of actions in the S-CSCF to achieve the complete recovery of the IMS. In addition, the following also describes preferred embodiments of a HSS 1 and a S-CSCF 2 respectively adapted for carrying out the above first or second methods.

FIG. 2 illustrates a first sequence of actions in accordance with first and second methods carried out during the registration of a given subscriber 5 in the IMS. For the sake of simplicity, references are made to the given subscriber throughout this specification rather than distinguishing between the given subscriber and a user equipment in use by the given subscriber, assuming that no misinterpretation may turn up for those skilled in the art in view of the reading of applicable 3GPP Technical Specifications.

The registration of the given subscriber starts with the submission of a register message in a step S-105 from the given subscriber 5 towards a P-CSCF 4 of the IMS, through an access network not depicted in any drawing for the sake of simplicity. The register message is forwarded in a step S-110 from the P-CSCF 4 towards an I-CSCF 3 in charge of selecting a S-CSCF suitable for serving the given subscriber. The I-CSCF 3 does not store individual subscriber data and interrogates during a step S-115 a HSS 1 holding subscriber data for subscribers of the IMS.

The HSS 1 may answer this interrogation with an identifier of a S-CSCF previously assigned for serving a given subscriber or with capabilities required by a selectable S-CSCF for serving the given subscriber, as illustrated in FIG. 2. The assumption is that the registration procedure illustrated in FIG. 2 is a first registration and no S-CSCF had been assigned yet.

With the capabilities received during a step S-120, the I-CSCF 3 selects a S-CSCF 2 for serving the given subscriber, namely a so-called S-CSCF-1, and forwards the register message towards the selected S-CSCF-1 during a step S-125. Then, the S-CSCF-1 confirms towards the HSS 1 during a step S-130 to be selected for serving the given subscriber. The confirmation is received at the HSS 1 wherein the selected S-CSCF-1 is assigned for serving the given subscriber by storing an identifier of the S-CSCF-1 in a memory module 13 of the HSS as depicted in FIG. 7 and FIG. 9. Then, in order to confirm back to the S-CSCF-1 its assignation at the HSS for serving the given subscriber, the HSS 1 may download during a step S-140 a service profile 201 for the given subscriber, namely a subscriber profile with all the subscriber data necessary for serving the given subscriber.

Apart from confirming its selection for serving the given subscriber, and in accordance with the first method to be applied in the HSS and with the second method to be applied in the S-CSCF for recovery of the IMS, the S-CSCF-1 submits towards the HSS 1 those contact data 202 required by the S-CSCF-1 to contact the given subscriber 5, or to contact the proxy server 4 through which the subscriber is accessible. This contact data 202 are saved in a data structure held per subscriber basis at a S-CSCF-1 for subscribers of the IMS served by said S-CSCF-1. In particular, these contact data may be submitted from the S-CSCF-1 towards the HSS 1 during the step S-130 along with the confirmation of being selected for serving the given subscriber, or may be submitted separately, even after having received the subscriber profile during the above step S-140. Moreover, even if these first and second methods for recovery are preferably started during the initial registration of a given subscriber, they might as well be started at any time afterwards, though increasing the possibilities of an unexpected restart for which no preventing action has been taken yet.

The contact data received in the HSS 1 from the S-CSCF-1 assigned for serving the given subscriber are stored in the HSS during a step S-135, preferably in the memory module 13 and associated with the identifier of the S-CSCF-1 assigned for serving the given subscriber. On the other hand, the S-CSCF-1 receiving the subscriber profile 201 for the given subscriber, also stores such subscriber profile, preferably in a memory module 22 illustrated in FIG. 8 and adapted to save the data structure shown in FIG. 3 and held per subscriber basis at the S-CSCF-1 for subscribers of the IMS served by said S-CSCF-1.

To this end, as illustrated in FIG. 7 and FIG. 9, the HSS 1 includes: a receiver 12 arranged for receiving, from a S-CSCF 2 selected for serving a given subscriber, namely the S-CSCF-1, contact data required by the S-CSCF-1 to contact the given subscriber 5, or to contact the proxy server 4 through which the subscriber is accessible; a memory module 13 for accessing subscriber data stored for each subscriber of the IMS and, in particular adapted for storing the contact data received from a S-CSCF assignable for serving a given subscriber; and a processor 10 arranged for accessing the memory module 13 to store the received contact data for the assigned S-CSCF-1. Where the above first and second methods for recovery of the IMS are carried out during an initial registration of the given subscriber, the receiver 12 is further arranged for receiving the confirmation from the S-CSCF-1 selected for serving the given subscriber; and the processor 10 is further arranged for assigning the S-CSCF-1 in the memory module as serving the given subscriber. Moreover, the sender 11 may further be arranged for downloading a subscriber profile 201 for the given subscriber towards the S-CSCF-1.

Also to this end, as illustrated in FIG. 8, the S-CSCF 2 assignable for serving the given subscriber registered in the IMS, namely the S-CSCF-1, includes: a memory module 22 for storing subscriber data, received from the HSS 1 holding subscriber data for subscribers of the IMS, for subscribers currently served in the S-CSCF; and a sender 23 arranged for submitting towards the HSS 1 contact data 202 required by the S-CSCF-1 to contact the given subscriber 5 or a proxy server 4 where the subscriber is accessible through. As for the HSS, where the above first and second methods for recovery of the IMS are carried out during an initial registration of the given subscriber, the S-CSCF 2 may include a receiver 21 arranged for receiving a registration of a given subscriber from an IMS entity, namely an I-CSCF 3 in this case, and the sender 23 of the S-CSCF 2 may further be arranged for submitting towards the HSS 1 a confirmation of being selected for serving the given subscriber. Moreover, the receiver 21 of the S-CSCF 2 may further be arranged for receiving from the HSS 1 a subscriber profile 201 for the given subscriber, and the processor 20 may further be arranged for storing in the memory module 22 the subscriber profile received from the HSS 1 for the given subscriber.

As already summarized above, the contact data 202 might include different, or rather complementary, sets of contact information elements required by the S-CSCF-1 to contact a given subscriber 5, or to contact a proxy server 4 through which the subscriber is accessible. In particular, this proxy server may operate in accordance with a Session Initiation Protocol (hereinafter SIP), and may be thus considered a SIP proxy server.

In a first embodiment of these first and second methods, the contact data may include, as contact information elements, a contact address to reach the P-CSCF 4 through which the given subscriber has accessed the IMS and, optionally, a contact address to reach the user equipment 5. To this end, as illustrated in FIG. 7 and FIG. 9, the processor 10 of the HSS 1 may be arranged for extracting as contact information elements from the contact data 202 a contact address to reach a P-CSCF 4 through which the given subscriber has accessed the IMS and, optionally, a contact address to reach the user equipment 5. Also to this end, as illustrated in FIG. 8, the sender 23 of the S-CSCF 2 may be arranged for submitting, as contact data 202, the contact address to reach the P-CSCF 4 where the user has accessed the IMS through and, optionally, a contact address to reach the user equipment 5.

In a second embodiment of these first and second methods, the contact data 202 may include a number of contact information elements selected from: user's Display-Name; uniform locator identifier as defined by a Session Initiation Protocol "SIP-URI"; list of contact addresses including a contact address of the user equipment in use by the given subscriber, which in particular may be an IP address; contact header parameters; list of proxy servers through which the subscriber is accessible; and combinations thereof. In particular, the list of proxy servers through which the subscriber is accessible may include in this second embodiment a P-CSCF 4 through which the given subscriber has accessed the IMS. Also in particular, the SIP URI may include in this second embodiment, as a contact information element, a Globally Routable User agent URI "GRUU" usable to take routing decisions. To this end, as illustrated in FIG. 7 and FIG. 9, the processor 10 of the HSS 1 may be arranged for extracting as contact information elements from the contact data: user's Display-Name, uniform locator identifier as defined by a Session Initiation Protocol "SIP-URI", list of contact addresses including an IP address of the user equipment in use by the given subscriber, contact header parameters, list of proxy servers through which the subscriber is accessible, and combinations thereof. In particular, the processor 10 of the HSS 1 may be arranged for obtaining from the list of proxy servers, through which the subscriber is accessible, a P-CSCF 4 through which the given subscriber has accessed the IMS. Also in particular, the processor 10 of the HSS may be arranged for obtaining from the SIP URI a Globally Routable User agent URI "GRUU" usable to take routing decisions. Also to this end, as illustrated in FIG. 8, the sender 23 of the S-CSCF 2 may be arranged for submitting, as contact data 202, a set of contact information elements selected from: user's Display-Name, uniform locator identifier as defined by a Session Initiation Protocol "SIP-URI", list of contact addresses including an IP address of the user equipment in use by the given subscriber, contact header parameters, list of proxy servers through which the subscriber is accessible, and combinations thereof. In particular, the sender 23 of the S-CSCF 2 may be arranged for submitting in the list of proxy servers, through which the subscriber is accessible, the P-CSCF 4 through which the given subscriber has accessed the IMS. Also in particular, the sender 23 of the S-CSCF 2 may be arranged for submitting as SIP URI a Globally Routable User agent URI "GRUU" usable to take routing decisions.

Back to the sequence of actions in accordance with first and second methods, exemplary carried out during the registration of the given subscriber 5 in the IMS and illustrated in FIG. 2, and after having received the subscriber profile 201 for the subscriber during the step S-140, the registration procedure goes on with a traditional acknowledge from the S-CSCF 2 of having been assigned for serving the given subscriber towards the I-CSCF 3 during a step S-145, such acknowledge forwarded during a step S-150 from the I-CSCF 3 towards the P-CSCF 4 through which the given subscriber has accessed the IMS, and a corresponding acknowledge submitted during a step S-155 from the P-CSCF 4 towards the user equipment 5 in use by the given subscriber.

The first and second methods for recovery of the IMS, respectively applied in the HSS 1 and the S-CSCF 2, continue during or after a restart of the S-CSCF 2 presently assigned for serving the given subscriber, and different embodiments may be provided for, depending on the course of actions occurring for the given subscriber at the time of such restart. For instance, where the restart occurs during an invitation originated from the given subscriber to communicate with another subscriber or with a service, or during an invitation originated from another subscriber to communicate with the given subscriber, or during a subsequent registration of the given subscriber with a different subscriber identity.

Generally speaking and further described, the first and second methods are completed in the above, and other embodiments, by including respective steps of providing and receiving contact information elements, selectable from the contact data 202 of a previously selected S-CSCF 2, from the HSS 1 towards a S-CSCF 2, 6 currently selected for serving the given subscriber; wherein the currently selected S-CSCF 2, 6 may be the same as, or different than, the previously selected S-CSCF.

In particular, the second method for recovery of the IMS to be applied in the selected S-CSCF may include a step not shown in any drawing of storing the contact information elements at the S-CSCF 2, 6 in order to further contact the given subscriber 5, or to contact the proxy server 4 through which the subscriber is accessible.

To this end, as illustrated in FIG. 7 and FIG. 9, the sender 11 of the HSS 1 is arranged for providing towards relevant IMS entities, particularly towards the S-CSCF 2, 6 currently selected for serving the given subscriber, contact information elements selectable from the contact data 202 of the previously selected S-CSCF 2. Also to this end, as illustrated in FIG. 8, the receiver 21 of the S-CSCF 2, 6, currently selected for serving the given subscriber, is arranged for receiving from the HSS 1 contact information elements selectable from the contact data of a previously assigned S-CSCF 2. In particular, where the step of storing the contact information elements takes place at the S-CSCF 2, 6, the processor 20 of the S-CSCF 2, 6 may further be arranged for accessing the memory module 22 to store the contact information elements received from the HSS 1 for the given subscriber.

Regarding the contact information elements that may be received at the S-CSCF 2, 6 currently selected for serving the given subscriber, and which are selectable from the contact data 202 of a previously selected S-CSCF 2, the first and second method assume as contact information elements, in a simplified embodiment, a contact address to reach the P-CSCF 4 through which the user has accessed the IMS and, optionally, a contact address to reach the user equipment 5. However, the first and second method assume as contact information elements, in a more general embodiment, a selection of: user's Display-Name; uniform locator identifier as defined by a Session Initiation Protocol "SIP-URI"; list of contact addresses including a contact address of the user equipment 5, particularly an IP address, in use by the given subscriber; contact header parameters; list of proxy servers 4 through which the subscriber is accessible; and combinations thereof. In particular, the list of proxy servers through which the subscriber is accessible may include the P-CSCF 4 through which the user has accessed the IMS. Also in particular, the SIP URI may include, as contact information element, a Globally Routable User agent URI "GRUU" usable to take routing decisions.

To this end, as illustrated in FIG. 8, where the simplified embodiment is applied, the receiver 21 of the S-CSCF 2, 6 may further be arranged for receiving, as contact information elements, a contact address to reach the P-CSCF 4 through which the user has accessed the IMS and, optionally, a contact address to reach the user equipment 5. However, where the more general embodiment is applied, the receiver 21 of the S-CSCF 2, 6 may further be arranged for receiving as contact information elements from the contact data 202: user's Display-Name; uniform locator identifier as defined by a Session Initiation Protocol "SIP-URI"; list of contact addresses including a contact address of the user equipment 5, particularly an IP address, in use by the given subscriber; contact header parameters; list of proxy servers 4 through which the subscriber is accessible; and combinations thereof. In particular, the processor 20 of the S-SCF 2, 6 may further be arranged for extracting, from the list of proxy servers through which the subscriber is accessible, the P-CSCF 4 through which the user has accessed the IMS. Also in particular, the processor 20 of the S-SCF 2, 6 may further be arranged for extracting, from the SIP URI as contact information element, a Globally Routable User agent URI "GRUU" usable to take routing decisions.

In a first embodiment illustrated in FIG. 4, the first and second methods for recovery of the IMS, respectively applied in the HSS 1 and the S-CSCF 2, are completed where the restart occurs during an invitation originated from the given subscriber to communicate with another subscriber or with a service.

The exemplary sequence of actions illustrated in FIG. 4 starts when the S-CSCF 2 assigned for serving the given subscriber, namely the S-CSCF-1, suffers a restart during a step S-165. Shortly after this restart, the given subscriber submits an invitation during a step S-170 to communicate with another subscriber or with a service. This invitation is received at the P-CSCF 4 through which the given subscriber has accessed the IMS, and the P-CSCF 4 forwards the invitation during a step S-175 towards the S-CSCF-1 known to the P-CSCF as being serving the given subscriber. In particular, the acknowledge received at the P-CSCF 4 in the step S-150, during the initial registration of the given subscriber described above, may have been accompanied by an identifier of the S-CSCF-1 to let the P-CSCF 4 know which is the S-CSCF 2 assigned for serving the given subscriber, namely the S-CSCF-1.

Upon receiving at the S-CSCF-1 the invitation from the given subscriber, the S-CSCF-1 realizes during a step S-180 that subscriber data for the given subscriber are lost, or at least not trustable, as a result of the previous restart, and queries the HSS 1 during a step S-185 about the given subscriber. The HSS 1 answers such query during a step S-190 and provides contact information elements selected from the contact data 202 stored at the HSS 1. The criteria for selecting contact information elements from the contact data 202 might reside at the HSS itself on a per procedure basis, or be provided by the S-CSCF 2 in the query. In addition, the HSS 1 might as well download again a subscriber profile 201 for the given subscriber along with the contact information elements as illustrated in FIG. 4, in order to save further signalling load, or the subscriber profile 201 may be downloaded separately afterwards.

To this end, as illustrated in FIG. 7 and FIG. 9, the receiver 12 of the HSS 1 may further be arranged for receiving a query about the given subscriber from the S-CSCF 2 serving the given subscriber, in this case the S-CSCF-1, and the sender 11 of the HSS 1 may further be arranged for providing the contact information elements towards said S-CSCF 2. In particular, the sender 11 of the HSS 1 may further be arranged for downloading a subscriber profile 201 for the given subscriber along with the contact information elements towards the assigned S-CSCF 2.

Also to this end, as illustrated in FIG. 8, the sender 23 of the S-CSCF 2 serving the given subscriber, in this case the S-CSCF-1, may further be arranged for sending a query towards the HSS 1 about the given subscriber, and the receiver 21 may further be arranged for receiving the contact information elements as response from the HSS. In particular, the receiver 21 of the S-CSCF 2 may further be arranged for receiving the subscriber profile 201 for the given subscriber along with the contact information elements from the HSS 1.

Afterwards, the still assigned S-CSCF-1 may continue the procedure in the traditional way and having all subscriber data required for further contacting the given subscriber 5, or the proxy server 4 through which the subscriber is accessible, thus overcoming any abnormal situation reachable after having suffered the restart.

In a second embodiment illustrated in FIG. 5, the first and second methods for recovery of the IMS, respectively applied in the HSS 1 and the S-CSCF 2, are completed where the restart occurs during an invitation originated from another subscriber to communicate with the given subscriber.

The exemplary sequence of actions illustrated in FIG. 5 starts when a S-CSCF 7 serving another subscriber, or other network node serving classical telephony subscribers such as a Media Gateway Control Function sever (hereinafter MGCF) 7 may be, submits during a step S-200 the invitation originated from another subscriber to communicate with the given subscriber towards the I-CSCF 3 of the IMS of the given subscriber. Upon receipt of such invitation, the I-CSCF 3 queries the HSS 1 during a step S-205 asking for a S-CSCF presently serving the given subscriber, or capabilities required for selecting a S-CSCF where no S-CSCF had been assigned yet.

Whilst the actions in steps S-200 and S-205 were occurring, or even before, the S-CSCF 2 already assigned for serving the given subscriber, namely the S-CSCF-1, suffers a restart during a step S-210. After this restart, the HSS 1 may still consider said S-CSCF-1 as assigned for serving the given subscriber and thus responds the query to the I-CSCF 3 indicating said S-CSCF-1 during a step S-215. The I-CSCF 3, then, forwards the received invitation towards the previously assigned S-CSCF-1 during a step S-220.

Upon receiving at the previously assigned S-CSCF-1 the invitation to communicate with the given subscriber, the S-CSCF-1 realizes during a step S-225 that subscriber data for the given subscriber are lost, or at least are not trustable, as a result of the previous restart, and requests the HSS 1 during a step S-230 to consider the given subscriber as unregistered. The HSS 1 answers such request during a step S-235 and provides contact information elements selected from the contact data 202 stored at the HSS 1, as an implicit indication to consider the given subscriber as registered. Alternatively and not shown in any drawing, apart from providing contact information elements during the step S-235, from the HSS 1 towards the S-CSCF 2 previously assigned for serving the given subscriber, the HSS 1 may explicitly request the S-CSCF 2 to consider the given subscriber as registered. As for the first embodiment illustrated in FIG. 4, also for this second embodiment illustrated in FIG. 5, the criteria for selecting contact information elements from the contact data 202 might reside at the HSS itself on a per procedure basis, or be provided by the S-CSCF 2 in the query. In addition, the HSS 1 might as well download the subscriber profile 201 for the given subscriber along with the contact information elements as illustrated in FIG. 5, in order to save further signalling load, or the subscriber profile 201 may be downloaded separately afterwards.

To this end, as illustrated in FIG. 7 and FIG. 9, the receiver 12 of the HSS 1 may further be arranged for receiving a request from the S-CSCF 2 serving the given subscriber to consider the given subscriber as unregistered, in this case the S-CSCF-1, and the sender 11 of the HSS 1 may further be arranged for providing the contact information elements towards said S-CSCF 2 responsive to this request. In particular, the sender 11 of the HSS 1 may further be arranged for downloading a subscriber profile 201 for the given subscriber along with the contact information elements towards the assigned S-CSCF 2.

Also to this end, as illustrated in FIG. 8, the sender 23 of the S-CSCF 2 serving the given subscriber, in this case the S-CSCF-1, may further be arranged for sending a request towards the HSS to consider the given subscriber as unregistered, and the receiver 21 may further be arranged for receiving the contact information elements as response from the HSS 1. In particular, the receiver 21 of the S-CSCF 2 may further be arranged for receiving the subscriber profile 201 for the given subscriber along with the contact information elements from the HSS 1.

Where an explicit request to consider the given subscriber as registered is sent from the HSS towards the S-CSCF 2 serving the given subscriber, the sender 11 of the HSS 1 may further be arranged for instructing the S-CSCF 2 presently serving the given subscriber to consider the given subscriber as registered; and the receiver 21 of the S-CSCF 2 may further be arranged for receiving a request to consider the given subscriber as registered.

Back to the sequence of actions in accordance with first and second methods, exemplary illustrated in FIG. 5, upon receipt of the contact information elements at the previously assigned S-CSCF-1, each particular contact information element may be extracted during a step S-240 and used to determine the proxy server through which the given subscriber is accessible, namely the P-CSCF 4. Afterwards, the previously assigned S-CSCF-1 forwards during a step S-245 towards the P-CSCF 4 the received invitation to communicate with the given subscriber, and the P-CSCF 4 submits towards the user equipment 5 in use by the given subscriber such invitation during a step S-250, thus overcoming any abnormal situation reachable after having suffered the restart.

In a third embodiment illustrated in FIG. 6, the first and second methods for recovery of the IMS, respectively applied in the HSS 1 and the S-CSCF 2, are completed where the restart occurs during a subsequent registration of the given subscriber likely with a different subscriber identity.

The exemplary sequence of actions illustrated in FIG. 6 starts with the reception of a register message at the I-CSCF 3 during a step S-260. Such register message had been submitted from the given subscriber 5 towards the P-CSCF 4 of the IMS through an access network, which is not depicted in FIG. 6 for the sake of simplicity. As for the initial registration of the given subscriber illustrated in FIG. 2, the I-CSCF 3 receiving such register message queries the HSS 1 during a step S-265 asking for a S-CSCF presently serving the given subscriber, or capabilities required for selecting a S-CSCF where no S-CSCF had been assigned yet. Since the HSS 1 still considers the S-CSCF-1 as assigned for serving the given subscriber, the HSS responds the query to the I-CSCF 3 indicating said S-CSCF-1 during a step S-270. The I-CSCF 3, then, forwards the received registration towards the previously assigned S-CSCF-1 during a step S-275.

However, as exemplary illustrated in FIG. 6 for this embodiment, the S-CSCF 2 previously assigned for serving the given subscriber, namely the S-CSCF-1, is currently suffering a restart during a step S-280, which might have started whilst the actions in steps S-260 to S-280 were occurring, or even before. In this situation, the S-CSCF 2 still assigned for serving the given subscriber, namely the S-CSCF-1, cannot accept the registration or even submit any information back to the I-CSCF 3, so that, likely after some re-attempts not shown in FIG. 6, the I-CSCF 3 may query the HSS 1 again during a step S-285 asking for capabilities required for selecting a new S-CSCF for serving the given subscriber. The HSS 1 responds the query to the I-CSCF 3 during a step S-290 indicating the capabilities required, and the I-CSCF 3 selects a new S-CSCF 6, namely S-CSCF-2, fulfilling such capabilities and thus being selectable for serving the given subscriber. Then, the I-CSCF 3 forwards the register message during a step S-295 towards the new S-CSCF 6 selected for serving the given subscriber, namely the S-CSCF-2. The new S-CSCF 3 submits a confirmation during step S-300 towards the HSS 1 of being selected for serving the given subscriber. The HSS 1 receiving such confirmation acknowledges the assignment of the new S-CSCF 3 for serving the given subscriber and provides during a step S-305 contact information elements selected from the contact data 202 stored at the HSS 1 for a previously assigned S-CSCF 2.

To this end, as illustrated in FIG. 7 and FIG. 9, the receiver 12 of the HSS 1 may further be arranged for receiving a confirmation from a new S-CSCF 6 selected for serving the given subscriber, and the sender 11 of the HSS 1 may further be arranged for providing the contact information elements towards said new S-CSCF 6. As for other embodiments, the sender 11 of the HSS 1 may, in particular, further be arranged for downloading a subscriber profile 201 for the given subscriber along with the contact information elements towards the new S-CSCF 6.

Also to this end, as illustrated in FIG. 8, the sender 23 of the S-CSCF 6 may further be arranged for sending a confirmation towards the HSS 1 of being selected for serving the given subscriber during a further registration of the given subscriber, and the receiver 21 of the S-CSCF 6 may further be arranged for receiving the contact information elements of a previously assigned S-CSCF 2 as response from the HSS. As for other embodiments, the receiver 21 of the S-CSCF 6 may, in particular, further be arranged for receiving the subscriber profile 201 for the given subscriber along with the contact information elements from the HSS 1.

Back to the procedure illustrated in FIG. 6 of assigning the new S-CSCF 3 whilst the previously assigned S-CSCF had suffered the restart, different actions may be carried out in addition to the above first and second methods for recovery of the IMS. For instance and not depicted in any drawing, where a particular load sharing mechanism is wanted between more than one S-CSCF, namely between the previous S-CSCF 2 and the new S-CSCF 6, any S-CSCF 2, 6 currently assigned for serving a given subscriber may submit at any time, in accordance with a further embodiment of the technology disclosed herein, a new message towards the HSS 1 requesting the removal of the assigned S-CSCF from the registration or assignation data, as the case might be, but with no update to the registration status of the given subscriber. This message might preferably be sent only if there are no SIP dialogues pending for that given subscriber, although it might also be used in other cases depending on how important it is to make a new assignment. In particular, this embodiment might be embedded in the above first and second methods so that, once the previously assigned S-CSCF 2 is de-assigned, the selection and assignment of the new S-CSCF 6 takes place as described under the above third embodiment. Also in particular, this embodiment might be applied after having assigned the new S-CSCF 6 and having reached the IMS recovery so that the new S-CSCF 6 triggers its own de-assignation so that a further selection of a S-CSCF for serving the given subscriber, selection made by the I-CSCF, might result in the selection of the previous S-CSCF 2 again.

Apart from the above embodiments where the methods for recovery of the IMS can be completed upon restart of a S-CSCF assigned for serving the given subscriber, one may also face the de-registration of a given subscriber. Where a S-CSCF 2 receives a de-registration request for a given subscriber, the S-CSCF 2 realizes that subscriber data for the given subscriber are lost, or at least not trustable, as a result of the previous restart, and queries the HSS 1 about the given subscriber. The HSS 1 answers such query and provides other registered identities in addition to the one that is being de-registered, likely along with contact information elements selected from the contact data 202 stored at the HSS 1.

The technology disclosed herein also provides for a computer program, loadable into an internal memory of a computer with input and output units as well as with a processing unit, the computer program comprising executable software adapted to carry out method steps as described above when running in the computer, and wherein the executable software may be recorded in a carrier readable in a computer.

The technology disclosed herein is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method for recovery of an IP Multimedia Subsystem (IMS) upon restart of a Serving Call Session Control Function server (S-CSCF) serving a given subscriber, the method comprising:

receiving at a Home Subscriber Server (HSS), which holds subscriber data for subscribers of the IMS, contact data from a first S-CSCF serving a given subscriber of the IMS;

storing at the HSS the contact data for the first S-CSCF;

receiving at the HSS, upon failure of the first S-CSCF, a confirmation from a second S-CSCF of being currently selected for serving the given subscriber; and providing contact information elements selectable from the contact data from the HSS towards the second S-CSCF;

wherein the contact information elements include: a contact address to reach a Proxy Call Session Control Function server (P-CSCF) through which the given subscriber has accessed the IMS, and a contact address of the user equipment in use by the given subscriber.

2. The method of claim 1, further comprising storing the contact information elements at the second S-CSCF to further contact the given subscriber or the P-CSCF through which the given subscriber is accessible.

3. The method of claim 1, wherein the contact data includes, as contact information elements, an IP address of the user equipment in use by the given subscriber.

4. The method of claim 1, wherein the contact data includes a number of contact information elements selected from: user's Display-Name, uniform locator identifier as defined by a Session Initiation Protocol "SIP-URI", contact header parameters, a list of proxy servers where the subscriber is accessible through, and combinations thereof.

5. The method of claim 4, wherein the SIP-URI includes, as contact information element, a Globally Routable User agent URI "GRUU" usable to take routing decisions.

6. A Home Subscriber Server (HSS) holding subscriber data for subscribers of an IP Multimedia Subsystem (IMS), the HSS comprising:
   a memory module for accessing subscriber data stored for each subscriber of the IMS;
   a receiver arranged for receiving contact data from a first Serving Call Session Control Function server (S-CSCF), selected for serving a given subscriber of the IMS;
   a processor arranged for extracting as contact information elements from the contact data: a contact address to reach a Proxy Call Session Control Function server (P-CSCF) through which the given subscriber has accessed the IMS and a contact address of the user equipment in use by the given subscriber;
   the processor arranged for accessing the memory module to store the received contact data for the first S-CSCF;
   the receiver arranged for receiving, upon failure of the first S-CSCF, a confirmation from a second S-CSCF of being selected for serving the given subscriber; and
   a sender arranged for providing towards the second S-CSCF the contact information elements selectable from the contact data of the first S-CSCF.

7. The HSS of claim 6, wherein the processor is further arranged for extracting as contact information elements from the contact data an IP address of the user equipment in use by the given subscriber.

8. The HSS of claim 6, wherein the processor is further arranged for extracting as contact information elements from the contact data: user's Display-Name, uniform locator identifier as defined by a Session Initiation Protocol "SIP-URI", contact header parameters, a list of proxy servers through which the subscriber is accessible, and combinations thereof.

9. The HSS of claim 8, wherein the SIP-URI includes as contact information element a Globally Routable User agent URI "GRUU" usable to take routing decisions.

10. The HSS of claim 6, wherein the receiver is further arranged for receiving a query about the given subscriber from the first S-CSCF serving the given subscriber, and the sender is further arranged for providing the contact information elements towards said first S-CSCF.

11. The HSS of claim 6, wherein the sender is further arranged for downloading a subscriber profile for the given subscriber along with the contact information elements towards the second S-CSCF.

12. A system comprising a first Serving Call Session Control Function server (S-CSCF) and a second Serving Call Session Control Function server (S-CSCF) assignable for serving a subscriber registered in an IP Multimedia Subsystem (IMS),
   wherein the first S-CSCF comprises:
      a sender arranged for submitting towards a Home Subscriber Server (HSS), which holds subscriber data for subscribers of the IMS, contact data of the first S-CSCF, wherein the contact data include a contact address to reach a Proxy Call Session Control Function server (P-CSCF) through which a given subscriber has accessed the IMS, and a contact address of the user equipment in use by the given subscriber;
   and wherein the second S-CSCF comprises:
      a memory module for storing subscriber data, received from the HSS, for subscribers currently served in the second S-CSCF;
      a sender arranged for sending, upon failure of the first S-CSCF, a confirmation towards the HSS of being selected for serving the given subscriber;
      a receiver arranged for receiving from the HSS, and responsive to the confirmation, contact information elements selectable from the contact data of the first S-CSCF; and
      a processor arranged for accessing the memory module to store the contact information elements received from the HSS for the given subscriber, wherein the contact information elements include: the contact address to reach the (P-CSCF), through which the given subscriber has accessed the IMS, and the contact address of the user equipment in use by the given subscriber.

13. The system of claim 12, wherein the receiver of the second S-CSCF is further arranged for receiving, as contact information elements, an IP address of the user equipment in use by the given subscriber.

14. The system of claim 12, wherein the receiver of the second S-CSCF is further arranged for receiving as contact information elements: user's Display-Name, uniform locator identifier as defined by a Session Initiation Protocol "SIP-URI", contact header parameters, a list of proxy servers where the subscriber is accessible through, and combinations thereof.

15. The system of claim 14, wherein the SIP-URI includes as contact information element a Globally Routable User agent URI "GRUU" usable to take routing decisions.

16. The system of claim 12, wherein the sender of the second S-CSCF is further arranged for sending a query towards the HSS about the given subscriber, and the receiver is further arranged for receiving the contact information elements as response from the HSS.

17. The system of claim 12, wherein the sender of the second S-CSCF is further arranged for sending a request towards the HSS to consider the given subscriber as unregistered, and the receiver is further arranged for receiving the contact information elements as response from the HSS.

18. The system of claim 12, wherein the receiver of the second S-CSCF is further arranged for receiving a subscriber profile for the given subscriber along with the contact information elements from the HSS.

19. A computer program stored on a non-transitory medium and loadable into an internal memory of a computer, the program comprising computer-readable instructions which, when executed, carry out the method according to claim 1.

* * * * *

UNITED STATES PATENT AND TRADEMARK OFFICE
CERTIFICATE OF CORRECTION

PATENT NO. : 8,438,257 B2
APPLICATION NO. : 12/668291
DATED : May 7, 2013
INVENTOR(S) : Belinchón Vergara et al.

It is certified that error appears in the above-identified patent and that said Letters Patent is hereby corrected as shown below:

On the Title Page, in Item (58), under "Field of Classification Search",
in Column 2, Line 1, delete "455/455/415," and insert -- 455/415, --, therefor.

In the Drawings:

In Fig. 6, Sheet 6 of 9, delete " 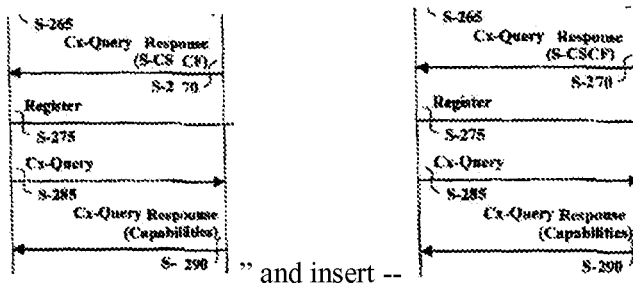 " and insert --  --, therefor.

In the Specification:

In Column 3, Line 32, delete "subscriber" and insert -- subscriber. --, therefor.

In Column 12, Line 29, delete "S-SCF 2," and insert -- S-CSCF 2, --, therefor.

In Column 12, Line 33, delete "S-SCF 2," and insert -- S-CSCF 2, --, therefor.

Signed and Sealed this
Eighth Day of October, 2013

Teresa Stanek Rea
*Deputy Director of the United States Patent and Trademark Office*